March 1, 1932.　　　G. W. HEBBELER　　　1,847,214
STORAGE BATTERY
Original Filed Aug. 15, 1925　　2 Sheets-Sheet 1
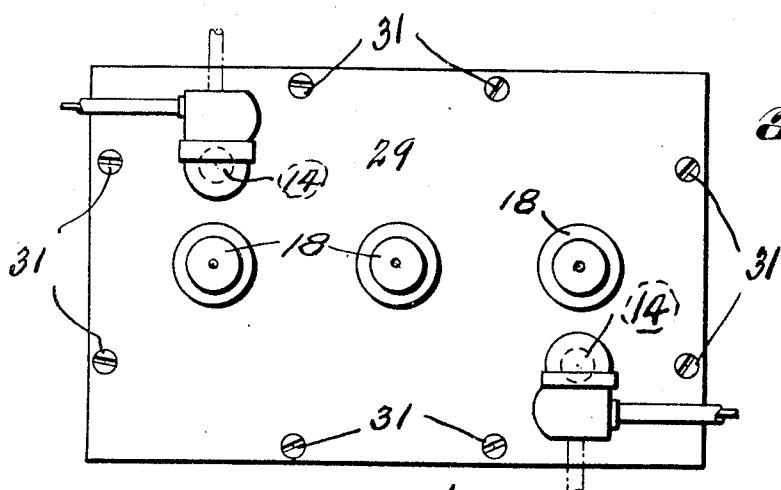
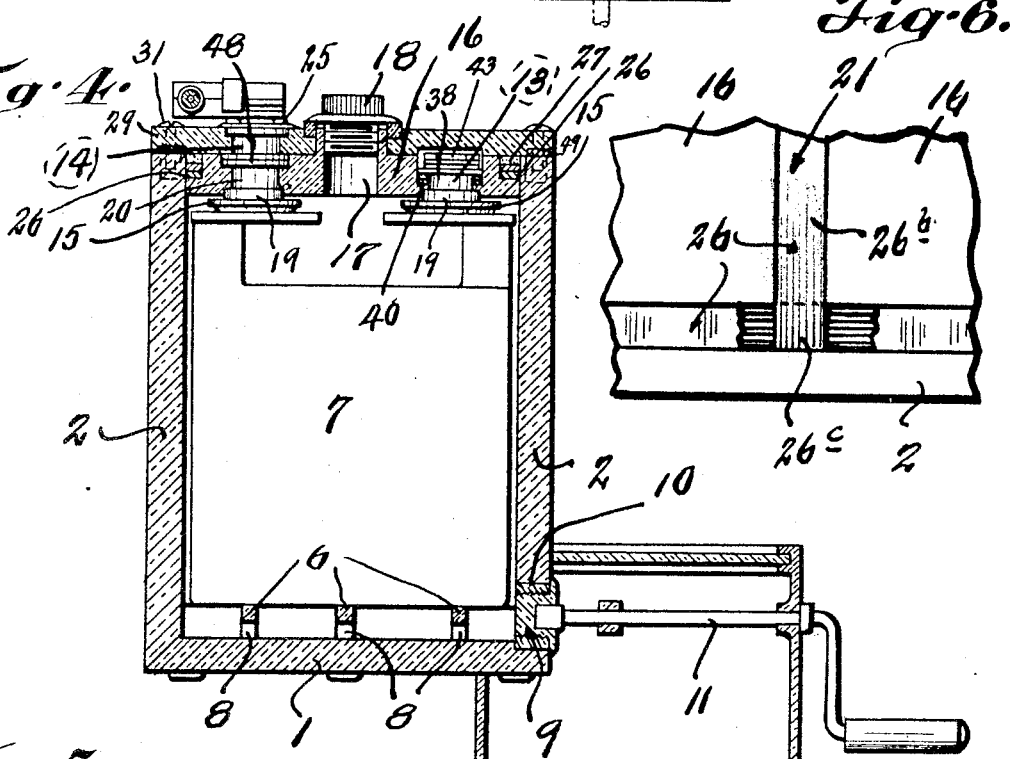
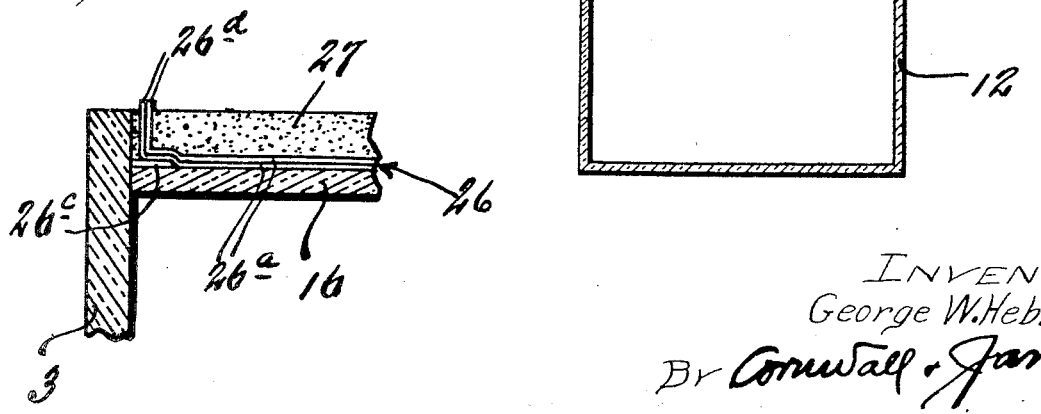
INVENTOR
George W. Hebbeler
By Cornwall & Jarvis
ATTORNEYS March 1, 1932.  G. W. HEBBELER  1,847,214
STORAGE BATTERY
Original Filed Aug. 15, 1925   2 Sheets-Sheet 2
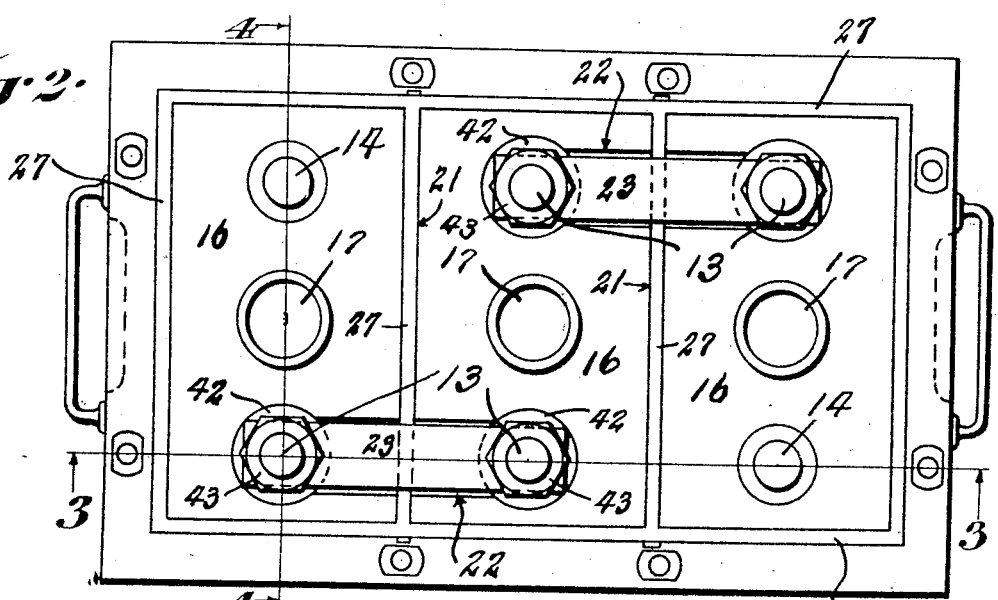
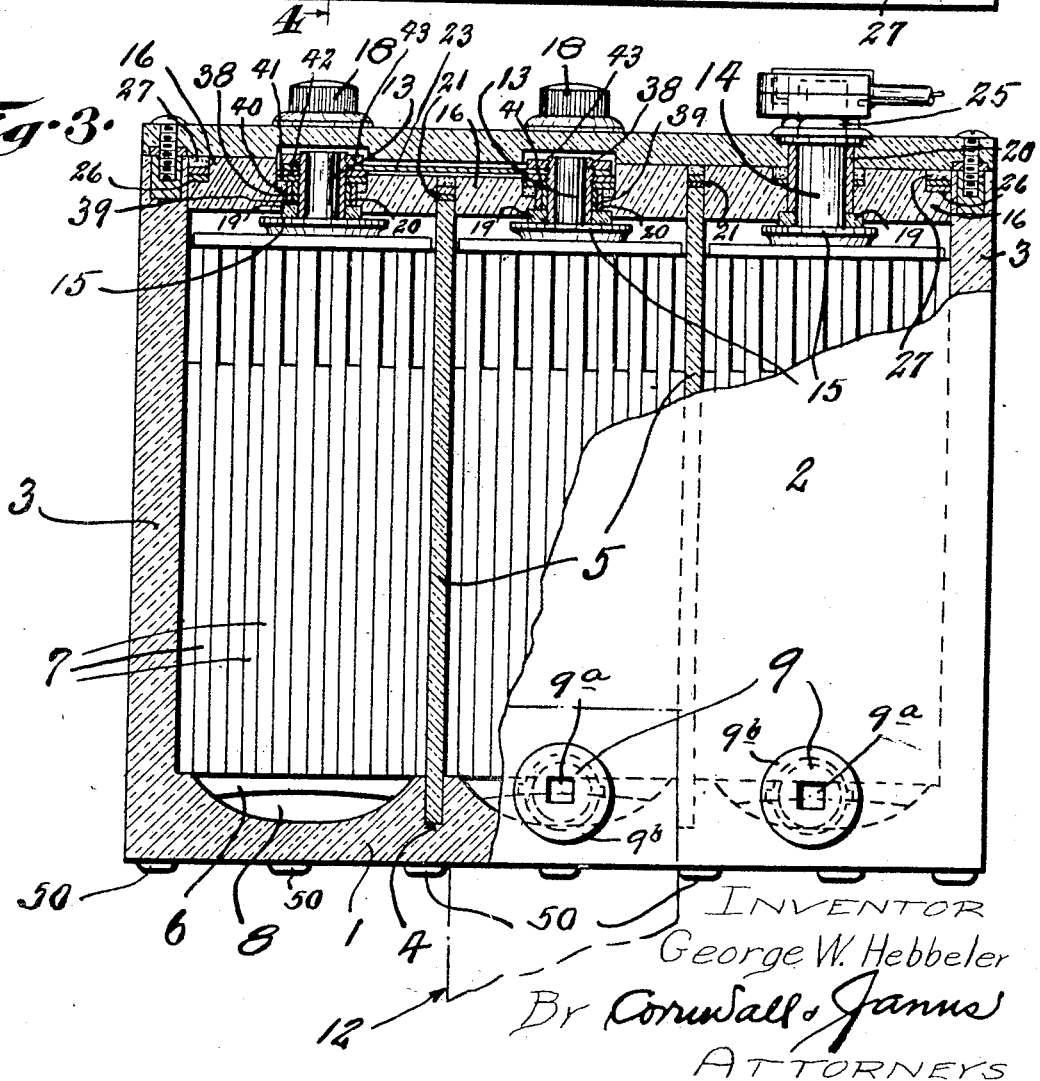
INVENTOR
George W. Hebbeler
By Cornwall & Jannus
ATTORNEYS Patented Mar. 1, 1932

1,847,214

UNITED STATES PATENT OFFICE

GEORGE W. HEBBELER, OF ST. LOUIS, MISSOURI

STORAGE BATTERY

Original application filed August 15, 1925, Serial No. 50,448, Patent No. 1,712,822, dated May 14, 1929. Divided and this application filed October 31, 1928. Serial No. 316,311.

This invention relates to new and useful improvements in storage batteries, and more particularly to means for sealing the same. The present application is a division of an application for United States Letters Patent filed by me August 15, 1925, Serial No. 50,448, which eventuated in United States Letters Patent No. 1,712,822.

The storage battery to which this invention appertains comprises a single container or case which is divided by suitable partition walls into the requisite number of cells or chambers. The partition walls are preferably removable and they, as well as the individual covers for the cells, are sealed by means of flexible strips of suitable material, such as fiber or fabric, said strips being embedded in a sealing compound which remains at all times in semi-plastic condition. These flexible strips are placed in the grooves formed by the individual covers and the side walls and partition walls of the container and are then covered by the sealing compound. Thus any one of the individual covers can be unsealed by the removal of the corresponding strips.

The primary objects of the present invention are to provide a storage battery which may be easily disassembled by an inexperienced person without the use of special tools for melting the sealing compound, and in which the individual covers can be removed without the necessity of disturbing the sealing joints of the other covers.

Further objects of the invention are to provide a storage battery wherein the separate cells or jars are eliminated and in which the terminals of the respective cells can be connected and disconnected without the necessity of melting and then molding the lead connectors, and to provide an efficient seal joint between the individual covers and the container whereby the removal and the application of the sealing compound can be effected by an inexperienced person without the use of torches or other apparatus.

With these and other objects in view, my invention consists in certain novel features of construction and arrangement of parts, hereinafter more fully described and claimed, and illustrated in the accompanying drawings, in which—

Figure 1 is a top view of the complete battery.

Figure 2 is an enlarged top plan view of the battery.

Figure 3 is in part a longitudinal vertical section taken substantially on line 3—3 of Figure 2, and in part is a side elevation of the battery.

Figure 4 is a vertical transverse section through the battery taken substantially on line 4—4 of Figure 2 and showing the application to the battery of a draining apparatus.

Figure 5 is an enlarged cross sectional detail view showing one end of the flexible strip exposed through the sealing compound.

Figure 6 is an enlarged detail view showing the arrangement of the longitudinal and transverse strips.

The battery case is preferably made of vulcanized rubber with the bottom wall 1, side walls 2, and end walls 3 all formed integrally. Suitable grooves 4 may be provided in the bottom and side walls of the battery for the purpose of receiving solid partitions 5 adapted to divide the case into separate cell containing or forming chambers. If desired, partitions 5 may be formed integrally with the bottom and side walls of the battery instead of being made of separate pieces inserted in grooves 4. I also prefer to provide integral ribs 6 extending transversely of the bottom of each cell chamber and forming an elevated support for the battery plates 7. The lower portion of each of ribs 6 is recessed as indicated at 8 to provide a clear passageway throughout the length of the cell member.

At one end of each cell chamber I provide a removable drain plug 9 which may be threaded into or otherwise interengaged with the sides of an opening in the bottom of the cell chamber. I have illustrated a preferred construction in which the side of the opening is formed by a winged bushing 10 of fiber or other material inserted into the walls of the case. The exterior of plug 9 is adapted to engage a tool, such as is indicated at 11 for the purpose of removing the drain plug. I prefer to provide a drainage vessel 12 with one corner cut away as indicated so that it may be fitted tightly against the bottom and side of the battery case and when so fitted will accommodate the tool 11 so that plug 9 may be removed with vessel 12 in the position shown.

The above described drainage arrangement enables any one to drain the electrolyte from the case without inverting the battery and without any danger of injury to the person or clothing due to contact with the electrolyte. If the top of the vessel be covered with glass, the protection is complete and at the same time the discharge of the electrolyte or other matter may be observed. After the electrolyte has been removed, the cell chamber may be washed out thoroughly by pouring water into the same through the usual opening provided at the top of the cell chamber and by this means any sediment which may have accumulated on the bottom of the chamber may be discharged through the drain opening. Thereupon the plug may be replaced and the electrolyte poured back into the cell chamber without the seal of the chamber ever having been disturbed. The above described construction affords the layman opportunity to service his battery at intervals and avoid the shortening of the life thereof by short-circuiting of the cell plates through the sediment usually deposited by the shedding of material by the plates.

The positive and negative plates 7 in each cell are respectively united at their upper ends in the usual manner and are provided with upstanding posts 13 and 14. The battery terminal posts 14 are smooth throughout most of their length but have a restricted portion threaded for nuts 25 referred to below. Each of the intermediate post 13 has its vertical face enclosed by a brass bushing 38 threaded near its upper end and jacketed below its thread with a lead sleeve 39. Each of the posts 13 and 14 is provided with a shoulder 15 which carries a washer 19 of rubber or like material. Above washer 19 each post is enclosed by a rubber tube 20.

Each cell chamber is provided with a cover 16 of vulcanized rubber or other insulating material fitting over tubes 20, resting on washer 19 and extending between the walls of the case and the adjacent partition or partitions 5. Each cover is provided with a central opening 17 which may be closed by a plug 18 in the usual manner.

Around the edge of each cover 16 I provide a groove for receiving sealing means for the cell chambers. This groove may be formed by a rabbet, in the edge of the cover, and the adjacent wall of the case, or it may be formed by the opposing sides of two adjacent covers and the top edge of a partition 5 as indicated at 21 in Figure 3. In sealing the cell chambers, I preferably place a strip of flexible material 26 in the bottom of the groove and over it place enough viscous, or semi-plastic, sealing material 27 to fill the groove. The flexible strip may be formed of fiber, fabric, or it may be formed of a combination of any of these materials. The object of this construction is to make it possible for the used to easily remove the sealing material and easily replace it later.

The upper face of each cover is recessed around each post and around each intermediate post 13 suitable sealing material 40 is placed in the bottom of the recess. A fiber washer 41 covers the sealing material and the upper end of rubber tube 20 and a metal washer 42 overlies fiber member 41. Straps 23 connect posts 13, lying in recesses in the covers 16 and overlying washers 42 and are clamped tightly against said washers by nuts 43 screwed onto the threaded end of the brass bushings 38, the remainder of the bushing being protected by its lead jacket 39. These nuts 43, through straps 23, also clamp the covers 16 against the washers 19 on post shoulders 15 and press the plates 7 onto their supporting ribs 6. Around each terminal post 14 is a seal 48 similar to that provided around covers 16.

By the use of the sealing elements referred to, the interior of each cell is completely closed from the atmosphere except for vent 17. Nevertheless, the ordinary layman can easily remove the nuts 43, the sealing strip carrying therewith material 27, and cover 16, whereupon the plates 7 may then be removed and inspected and repaired and the parts then replaced in the reverse order, again making the cell tight. All of the above operations are performed without any lead-burning or other comparatively difficult operation requiring special equipment and training.

A gasket 49 on the edge of the case acts as a seal and a cushion for a lid 29, preferably of vulcanized rubber, which extends solidly over the case except for spaced openings for the battery positive and negative posts and for openings over the vent 17 leading to each cell chamber. These central openings in lid 29 will receive the cell closing plugs 18. Suitable recesses in the under side of the lid will accommodate the ends of posts 13 and their nuts 43. The lid may be securely fastened to the edges of the case walls by finely threaded machine screws 31 of fiber material, to receive which screws I provide renewable bushings 44 so that breaking of threads will not require a new case or an unsecured lid. Other lid securing means may be provided and I show additional means in nuts 25 which clamp the lid against covers 16, thereby making a firm connection between all parts of the entire battery structure. With the lid in place, the covers 16 of the cell chambers and the cell connecting straps 23 are fully protected against injury by external objects.

The case may be recessed, as indicated at 46, to provide a finger hold or it may have a handle 47 attached in the usual manner.

As shown in the drawings, two strips 26 are used in the instant case, but if desired only one strip of suitable thickness can be used. There are two longitudinal strips 26ª which extend the full length of the longitudinal grooves, while transverse strips 26ᵇ are coextensive with the length of the transverse grooves.

In placing the strips in position, transverse strips 26ᵇ are laid first, whereupon the longitudinal strips 26ª are laid. In this manner said longitudinal strips 26ª overlie the ends 26ᶜ of transverse strips 26ᵇ and prevent said ends 26ᶜ from being covered by the sealing compound, as indicated in Figure 5. The ends 26ᵈ of each longitudinal strip are turned upwardly at the end of the groove and are left exposed above the sealing compound.

The purpose of this is to provide ready means for engaging and displacing said strip, when it is desired to unseal the particular joint. In the case of the transverse strips 26ᵇ, one of the longitudinal strips 26ª is displaced until one end 26ᶜ of the particular transverse strips is left exposed by such displacement, whereupon such transverse strips can be readily disengaged by means of the exposed end 26ᶜ. In this manner, only portions of strips 26ª have to be displaced and only such of the strips 26ᵇ as are required are disengaged, the remaining transverse strips 26ᵇ being left intact.

As only the ends 26ᵈ are upturned and they are embedded in the sealing compound, the efficiency of the seal is not impaired. The sealing compound remains in semi-plastic condition at all times; consequently no means are necessary to heat the same in case of unsealing the joint and such material can be removed and replaced immediately.

By the use of my improved sealing means, the production and repair of storage batteries is greatly facilitated and the cost thereof reduced.

No claim is made in the present application to the construction of the drainage vessel as this forms the subject matter of a copending application Serial No. 316,312, filed of even date (now Patent No. 1,823,448, granted September 15, 1931).

I claim:

1. In a storage battery, the combination of an open topped case, a cover therefor fitting within said top, there being an upwardly presented groove formed by said case and said cover coextensive with and surrounding the joint formed thereby, a series of strips of flexible material laid in the bottom of said grooves, each strip being of sufficient width to cover the entire space between the vertical walls of each groove, and a sealing compound covering said strips and completely filling said groove, one end of one of said strips being turned upwardly and extended above said compound and the latter being normally in semi-plastic condition whereby said strip and said compound can be displaced by engaging said projecting end of the strip and displacing the latter.

2. In a storage battery, the combination of an open-topped case, partitions dividing said case into separate liquid chambers and terminating a short distance below the edges of said case, individual covers for said chambers, there being formed when said individual covers are placed longitudinally and transversely disposed grooves surrounding each cover, a separate strip of flexible material laid in the bottom of each transverse groove, the length of each of said strips being greater than the length of the transverse groove, whereby the ends of each of said strips extend into said longitudinally disposed grooves, a separate strip of flexible material laid in the bottom of each longitudinal groove and overlying the ends of said transverse strips, and semi-plastic sealing material completely filling said grooves and covering said strips, said strips being of sufficient widths to cover the entire spaces between the vertical walls of said grooves and being removable to unseat the sealing material, contained in said grooves, one end of said strips being turned upwardly and extended above said sealing material.

3. In a storage battery, the combination of an open topped case, partitions dividing said case into separate liquid chambers and terminating a short distance below the edges of said case, individual covers for said chambers, there being longitudinally and transversely disposed grooves surrounding each cover, a strip of flexible material laid in the bottom of each transverse groove with the ends of said strip extending into said longitudinally disposed grooves, a strip of flexible material laid on the bottom of each longitudinal groove and overlying the ends of said transverse strips, and semi-plastic sealing material completely filling said grooves and covering said strips, said strips being of sufficient widths so as to cover the spaces between the vertical walls forming said grooves and said strips being removable to displace said sealing material, the ends of said longitudinal strips being turned upwardly and terminating above said sealing material to facilitate the removal of said longitudinal strips.

4. In a storage battery, the combination of an open-topped case, partitions dividing said case into separate liquid chambers and terminating a short distance below the edges of said case, individual covers for said chambers, said covers cooperating with the respective walls to form a pair of upwardly presented longitudinally disposed grooves and a series of upwardly presented transversely disposed grooves communicating with said longitudinal grooves, a strip of flexible material placed in each transverse groove with the ends of said strip extending into the longitudinal grooves, a strip of flexible material placed in each longitudinal groove and overlying the ends of said transverse strips, one end of each longitudinal strip being turned upwardly and terminating above the respective groove, each strip being of substantially the same width as the width of the corresponding groove so as to cover the entire bottom thereof, and semi-plastic sealing material completely filling said grooves and covering said strips with the exception of the extremity of said upturned end whereby said longitudinal grooves are displaceable by engaging the exposed end thereof to remove the sealing compound from the longitudinal grooves and said transverse strips are removable by means of the ends thereof exposed by the displacement of said longitudinal strips.

In testimony whereof I hereunto affix my signature this 22nd day of October, 1928.

GEORGE W. HEBBELER.